United States Patent
Monde et al.

(10) Patent No.: US 6,704,647 B1
(45) Date of Patent: Mar. 9, 2004

(54) NAVIGATION SYSTEM

(75) Inventors: Yasuhiro Monde, Tokyo (JP); Kazuya Tabata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/018,665

(22) PCT Filed: Apr. 21, 2000

(86) PCT No.: PCT/JP00/02644

§ 371 (c)(1),
(2), (4) Date: Dec. 21, 2001

(87) PCT Pub. No.: WO01/81869

PCT Pub. Date: Nov. 1, 2001

(51) Int. Cl.[7] ............................................... G01C 21/00
(52) U.S. Cl. ..................... 701/208; 701/207; 701/209; 701/210; 340/990; 340/995
(58) Field of Search ................................ 701/208, 207, 701/209, 202, 210, 214; 340/990, 995

(56) References Cited

U.S. PATENT DOCUMENTS

| | | | |
|---|---|---|---|
| 4,914,605 A | 4/1990 | Loughmiller, Jr. et al. | . 345/649 |
| 5,157,614 A | 10/1992 | Kashiwazaki et al. | ...... 701/200 |
| 5,544,087 A | * 8/1996 | Nakajima et al. | ........... 701/200 |
| 5,944,768 A | * 8/1999 | Ito et al. | ...................... 701/200 |
| 6,405,126 B1 | * 6/2002 | Palomo et al. | .............. 701/202 |

FOREIGN PATENT DOCUMENTS

| | | | | |
|---|---|---|---|---|
| EP | 0 773 525 A | | 5/1997 | |
| EP | 0 822 530 A1 | | 2/1998 | |
| JP | 3-184199 A | | 8/1991 | |
| JP | 3184199 | * | 8/1991 | ......... G08G/1/0969 |
| JP | 4-70998 A | | 3/1992 | |
| JP | 470998 | * | 4/1992 | ......... G08G/1/0969 |
| JP | 9-113296 A | | 5/1997 | |

* cited by examiner

Primary Examiner—Marthe Y. Marc-Coleman
(74) Attorney, Agent, or Firm—Birch, Stewart, Kolasch & Birch, LLP

(57) ABSTRACT

When it is decided that the current vehicle position is outside an area described by map data stored on a CD-ROM 21-i loaded in a disk storage drive 1, a disk-switching message is produced for switching the CD-ROM 21-i to a CD-ROM 21-j having stored thereon map data describing the area covering the current vehicle position. This makes the user aware of the necessity for switching to the CD-ROM 21-j having the map data describing the area toward which the vehicle is traveling; hence, reliable navigation information is provided continuously over an extended route to the user's destination.

3 Claims, 3 Drawing Sheets

NAVIGATION SYSTEM

This application is the national phase under 35 U.S.C. §371 of PCT International Application No. PCT/JP00/02644 which has an International filing date of Apr. 21, 2000, which designated the United States of America.

TECHNICAL FIELD

The present invention relates to a navigation system that reads out map data from a plurality of storage media each having stored thereon map data about a particular area and provides navigation information on the optimum route to the intended destination for each area.

BACKGROUND ART

The navigation system is to direct the vehicle to the intended destination from the place where the vehicle is currently traveling (hereinafter referred to as a current vehicle position). On the user's setting of his destination, the navigation system detects the current vehicle position by means of various sensors, and makes a search for the optimum route to the destination through utilization of the detected current vehicle position and map data prestored on each storage medium such as a CD-ROM (Compact Disk-Read Only Memory) or DVD-ROM (Digital Versatile Disk-Read Only Memory). And the navigation system displays, for example, the current vehicle position and the route to the destination on the road map displayed on a monitor and, at the same time, provides the navigation information in a computer-generated voice. At this time, the road map on the monitor as well as the current vehicle position thereon change every moment as the vehicle travels, and the voice message also changes accordingly.

On the storage medium there are usually prestored wide-area map data (rough map data describing the entire area of Japan or Europe, for instance) and detailed map data on a limited area (detailed map data describing the Kanto, Chubu or Kansai area of Japan, or each European country, for instance).

With a conventional navigation system disclosed, for example, in Japanese Patent Application Laid-Open Gazette No. 113296/97, when the vehicle travels from one area to another, for example, from Osaka to Shikoku in Japan or from France to Italy in Europe, rough navigation information on the route is given based on wide-area map data recorded on any storage media, whereas detailed information is derived from map data recorded on the storage media that describes the current vehicle position, the destination and intermediate areas.

With the conventional navigation system of the above configuration, when the vehicle travels out of the area described by the detailed map data read out of the storage medium loaded in a disk storage drive, detailed navigation information becomes difficult to present, and hence rough map data will be used instead. In practice, however, the user is often reluctant to switch the currently loaded storage medium to another for the new area until the information based on the rough map data actually imposes a considerable inconvenience on him. Thus, the conventional navigation system lacks operating ease in continuously providing appropriate navigation information over an extended route to the destination.

It is therefore an object of the present invention to provide an easy-to-use navigation system which, upon deciding that the current vehicle position is outside the area described by the map data being read out of the storage medium, provides an indication to make the user aware of the necessity for switching to a storage medium having stored thereon detailed map data on the area including the current vehicle position.

Another object of the present invention is to provide an easy-to-use navigation system which, upon deciding that the current vehicle position is inside the area described by the map data being read out of the storage medium, provides an indication to make the user aware of the necessity for switching to a storage medium having stored thereon map data on the area for which the vehicle is heading.

DISCLOSURE OF THE INVENTION

According to an aspect of the present invention, the navigation system makes a check to see if the current vehicle position is inside the area described by the predetermined map data being read out of the storage medium by the disk storage drive, and if not, gives an indication of the necessity for switching the current storage medium to another having stored thereon map data that describes the neighboring area including the current vehicle position. This creates awareness in the user about the necessity for switching to the above-mentioned another storage medium so as to obtain detailed navigation information. Accordingly, the navigation system of the present invention is cable of providing reliable information continuously over an extended route.

According to another aspect of the present invention, the navigation system makes a check to see if the intended destination is inside the area described by the predetermined map data being read out of the storage medium by the disk storage drive, and if so, gives an indication of the necessity for switching the current, storage medium to another having stored thereon map data that describes the neighboring area including the intended destination.

According to still another aspect of the present invention, the navigation system makes a check to see if the current vehicle position is in a predetermined place in the area described by the map data being read out of the storage medium by the disk storage drive, and if so, gives an indication of the necessity for switching the current storage medium to another having stored thereon map data that describes the neighboring area for which the vehicle is heading. This creates awareness beforehand in the user about the necessity for switching to the above-mentioned another storage medium so as to obtain detailed navigation information. Accordingly, the navigation system of the present invention is cable of providing reliable information continuously over an extended route.

BEST MODE FOR CARRYING OUT THE INVENTION

The best mode for carrying out the present invention will now be described with reference to the accompanying drawings to explain the invention in more detail.

Embodiment 1

Figure 1:
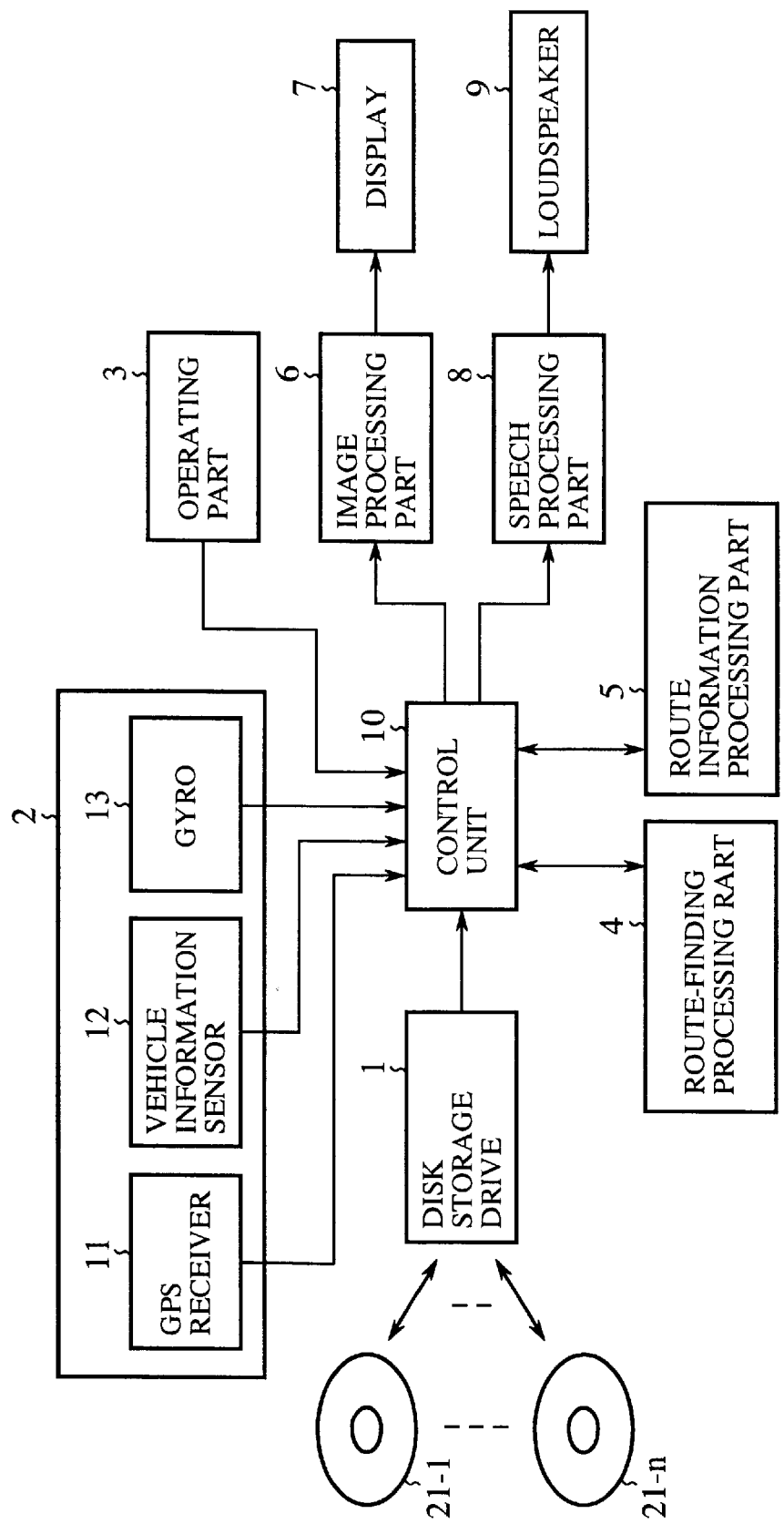
FIG. 1 is a block diagram of a navigation system according to Embodiment 1 of the present invention.

FIG. 1 illustrates in block form the configuration of a first embodiment (Embodiment 1) of the navigation system according to the present invention. Reference numeral 1 denotes a disk storage drive for reading out required map data from a CD-ROM 21-i (where i=1, . . . , n) placed therein. The CD-ROM 21-i has stored thereon wide-area map data describing the whole area of Europe or the whole country of Japan, for instance, and detailed map data describing a limited area such as the Kanto, Chubu or Kansai area of Japan, or each European country. Reference numeral 2 denotes current vehicle position detecting means composed of a GPS (Global Positioning System) receiver 11 for receiving radio waves from a GPS satellite, a vehicle information sensor 12 for obtaining such vehicle information as vehicle speed, and a gyro 13; 3 denotes an operating part through which a user sets his destination, for instance, and performs various other manipulations.

Reference numeral 4 denotes a route-finding processing part for finding the route from the current vehicle position to the intended destination by a predetermined method such as a Dijkstra method; and 5 denotes a route information processing part for generating image and speech guide data about the current vehicle position on the route found.

Reference numeral 6 denotes an image processing part for processing the image data into an image signal for application to a display 7; 7 denotes the display (disk-switching message producing means) for displaying a message corresponding to the image signal; 8 denotes a speech processing part for processing the speech data into a speech signal for application to a loudspeaker 9; 9 denotes the loudspeaker (disk-switching message producing means) for providing voice message corresponding to the speech signal; and 10 denotes a control part (decision means) which sends and receives various pieces of information to and from respective parts of the navigation system and controls them.

Figure 2:
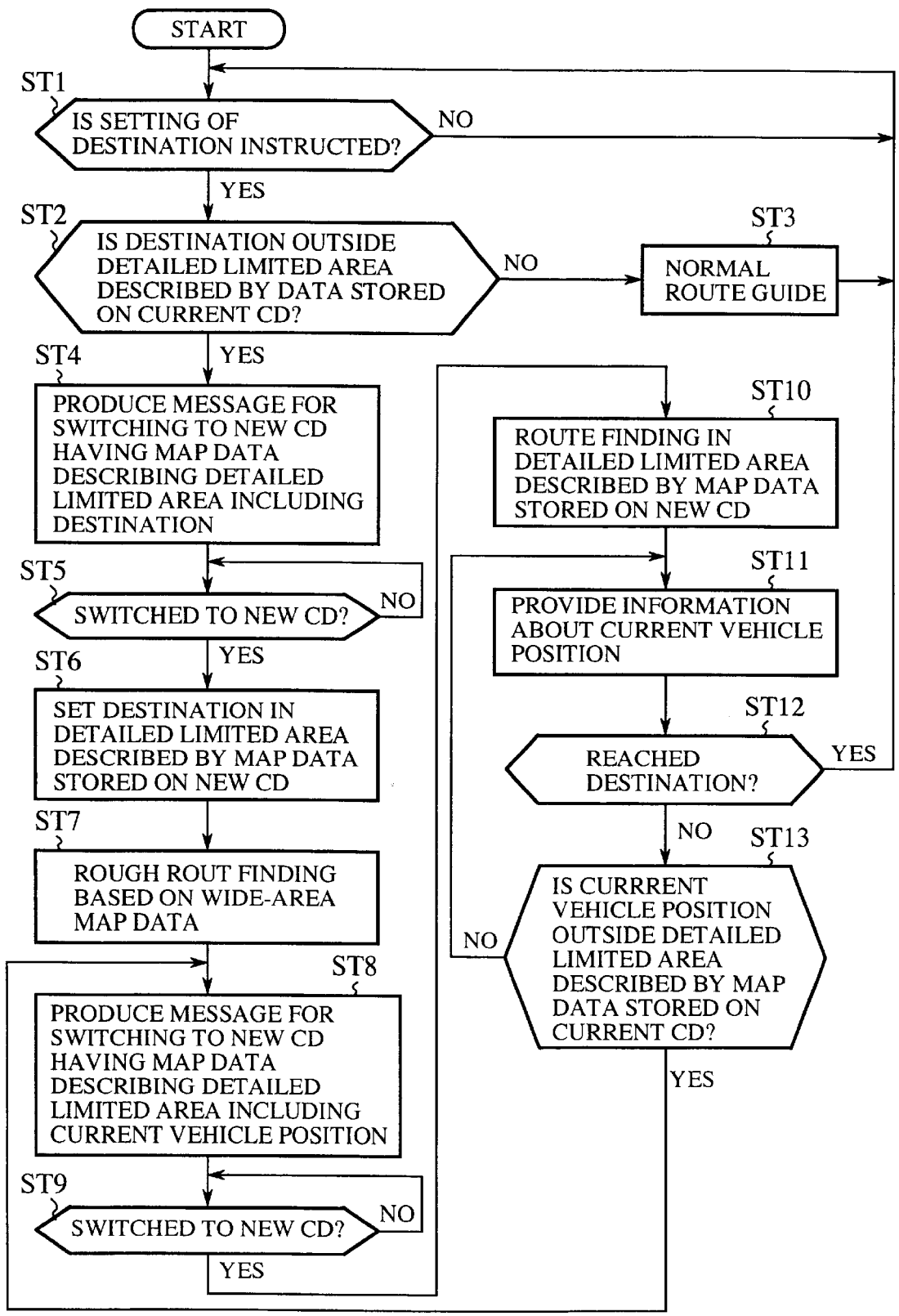
FIG. 2 is a flowchart explanatory of the operation of the navigation system according to Embodiment 1 of the invention.
Figure 3:
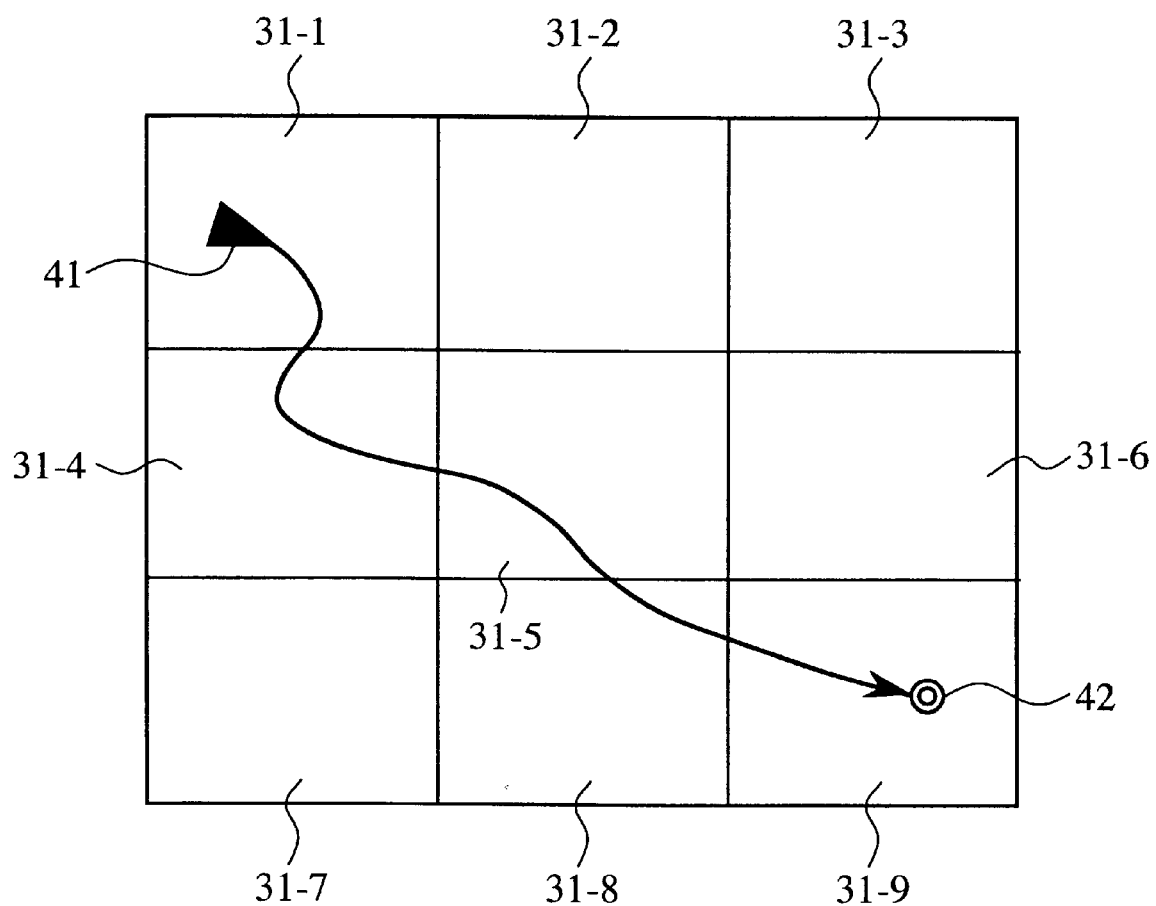
FIG. 3 is a diagram showing an example of a route extending over a plurality of areas.

FIG. 2 is a flowchart for explaining the operation of the navigation system according to Embodiment 1, and FIG. 3 is a diagram showing an example of a route extending over a plurality of areas.

In the first place, the control part 10 waits in step ST1 until the user manipulates the operating part 3 to instruct setting his intended destination. On issuance of user's instruction for setting his destination, the control part 10 goes to step ST2, and makes a check to see if the user intended destination is outside the area described by the detailed limited-area map data (which area will hereinafter be referred to as a detailed limited area) being read out of the CD-ROM 21-i currently placed in the disk storage drive 1.

If the destination is found in the detailed limited area by the CD-ROM-i currently loaded in the disk storage, drive 1, the control part 10 goes to step ST3, in which it reads out the detailed limited-area map data from the current CD-ROM 21-i, then causes the route-finding processing part 4 to find the route from the current vehicle position to the destination through the use of the read-out detailed limited-area map data, and causes the route information processing part 5 to generate guide data (or navigation information) on the route thus found. And the control part 10 controls the image processing part 6 to process image data contained in the guide data to display the corresponding message on the display 7, while at the same time it controls the speech processing part 8 to process speech data contained in the guide data to provide the corresponding voice message from the loudspeaker 9.

On the other hand, if the user's destination is outside the detailed limited area by the CD-ROM 21-i currently placed in the disk storage drive 1, the control part 10 goes to step ST10, in which it generates image and speech guide data indicating the switch to a CD-ROM 21-j (where i≠j) on which there is stored map data describing a different detailed limited area including the user's destination. The control part 10 controls the image processing part 6 to process image data contained in the guide data to display the corresponding message on the display 7, while at the same time it causes the speech processing part 8 to process speech data to provide the corresponding voice message from the loudspeaker 9.

In this way, a message "Switch to CD-ROM for (Destination)," for instance, is displayed on the display 7 and the corresponding voice message is provided from the loudspeaker 9. Incidentally, the "(Destination)" is given in the form of the name of the destination or the number of the CD-ROM preassigned thereto.

The control part 10 monitors, in step ST5, the disk storage drive 1 and waits until after the user's switching to the CD-ROM 21-j. Upon completion of the switching operation, the control part 10 goes to step ST6 to read out detailed limited-area map data from the newly loaded CD-ROM 21-j and perform setting of the destination by displaying the detailed limited-area map data, accepting the user's manipulation, etc.

After setting the destination based on the detailed limited-area map data, the control part 10 proceeds to step ST7, in which it reads out rough, wide-area map data from the CD-ROM 21-j and causes the rout-finding processing part 4 to search for the route to the destination from the current vehicle position detected by the current vehicle position detecting means 2. For example, the rough route thus found based on the rough map data is superimposed on the wide-area map on the display 7, or used when no detailed route information is available.

Upon completion of the search for the route to the destination through utilization of the rough wide-area map data, the control part 10 goes to step ST8 to provide navigation information on the detailed route based on detailed limited-area map data. In the first place, the control part 10 generates image and speech guide data indicating the switching to the CD-ROM 21-i having stored therein data that describes the detailed limited area including the current vehicle position. Then, the control part 10 controls the image processing part 6 to process image data contained in the guide data into an image signal to display the corresponding message on the display 7, while at the same time it causes the speech processing part 8 to process speech data into a speech signal to provide the corresponding voice message from the loudspeaker 9.

In this way, a message "Switch to CD-ROM for (Destination)," for instance, is displayed on the display 7 and the voice message is provided from the loudspeaker 9.

Following this, in step ST9 the control part 10 monitors the disk storage drive 1 and waits until after the user's switching to the CD-ROM 21-i. Upon completion of the switching operation, the control part 10 goes to step ST10 to read out detailed limited-area map data from the newly loaded CD-ROM 21-i and causes the route-finding processing part 4 to search for the route to the destination in the read-out detailed limited-area map.

And in step ST11 the control part 10 controls the route information processing part 5 to generate guide data about the current vehicle position detected by the current vehicle position detecting means 2, and causes the image processing part 6 to process image data contained in the guide data to display the corresponding message on the display 7 and the speech processing part 8 to process speech data in the guide data to provide the corresponding voice message from the loudspeaker 9.

Then the control part 10 goes to step ST12, in which it makes a check to see if the vehicle has reached the intended destination, and if so, the control part 10 finishes the current route-finding session and returns to step ST1.

On the other hand, when it is found in step ST12 that the vehicle has not reached the destination yet, then the control part 10 goes to step ST13 and makes a check to determine whether the current vehicle position detected by the current vehicle position detecting means 2 is outside the limited area described by, detailed limited-area map data read out of the CD-ROM 21-i currently placed in the disk storage drive 1. When it is found that the current vehicle position is outside the detailed limited area, the control part 10 returns to step ST8 and obtains image and speech guide data indicating the switching to a different CD-ROM 21-m having stored therein data describing a different detailed limited area including the current vehicle position. Then, the control part 10 controls the image processing part 6 to process image data contained in the guide data to display the corresponding message on the display 7, while at the same time it causes the speech processing part 8 to process speech data to provide the corresponding voice message from the loudspeaker 9. If the switching to the CD-ROM 21-m is not completed even after a certain elapsed time, it is also possible to keep on providing rough navigation information until the switching operation is completed.

Thereafter, upon completion of the switching to the CD-ROM 21-m by the user, the route finding operation in the detailed limited area by the CD-ROM 21-m is carried out and, as required, detailed navigation information is provided just in the same way as described above.

When the current vehicle position in inside the limited area described by the detailed limited-area map data read out of the currently loaded CD-ROM-i, the control part 10 returns to step ST11, providing information about the current vehicle positions having changed with the travel of the vehicle.

Thus, when the current vehicle position shifts out of the detailed limited area described by the detailed limited-area map data read out of the currently loaded CD-ROM-i, its switching to a different CD-ROM is indicated, and navigation information is continuously provided using detailed limited-area map data read out of respective CD-ROMs that are switched one after another until the vehicle reaches the intended destination.

FIG. 3 depicts an example in which the navigation system has set therein nine CD-ROMs 21-1 to 21-9 on which there are stored map data describing nine detailed limited areas 31-1 to 31-9, respectively. Now, consider the case where the current vehicle position 41 is in the detailed limited area 31-1 and the intended destination 42 is in the detailed limited area 31-9. The first step is to present an indication of switching to the CD-ROM 21-9 corresponding to the detailed limited area 31-9 in which the user's destination is traveling (step ST4). And, the CD-ROM 21-9 is loaded in the disk storage drive 1 (step ST5).

The next step is to search for the optimum route from the current vehicle position 41 to the intended destination 42 through utilization of wide-area, rough map data (describing the detailed limited areas 31-1 to 31-9 in their entirety) stored in the CD-ROM 21-9 (step ST7), followed by the indication of the necessity for its switching to the CD-ROM 221-1 corresponding to the detailed limited area 31-1 where the vehicle is currently traveling (step ST8).

And until the vehicle enters the detailed area 31-4, detailed navigation information is provided using the detailed limited-area map data out of the CD-ROM 21-1 (step ST11). On vehicle's entering the detailed limited area 31-4, information is provided which indicates the necessity for switching to the CD-ROM 21-4 corresponding to the detailed limited area 31-4 (step ST8).

Thereafter, upon each shift of the current vehicle position from area to area, the above-described operation is repeated. That is, when the vehicle enters the detailed limited area 31-5, information indicating the necessity for switching to the CD-ROM 21-5 having stored thereon detailed limited-area map data describing the limited area 31-5 (step ST8); when the vehicle enters the detailed limited area 31-8, information is provided which indicates the necessity for switching to the CD-ROM 21-8 having stored thereon detailed limited-area map data describing the area 31-8 (step ST8); and when the vehicle enters the detailed limited area 31-9, information is provided which indicates the necessity for switching to the CD-ROM 21-9 having stored thereon detailed limited-area map data describing the area 31-9 (step ST8).

And the vehicle is guided to the intended destination in the detailed area 31-9; when it is decided that the vehicle has reached the destination, the route-guide procedure ends (step ST12).

Incidentally, the detailed area maps need not be limited specifically to such a uniform shape as depicted in FIG. 3, but they may also be of other shapes. Although the number of detailed area maps in FIG. 3 is nine, but it need not be limited specifically thereto. Further, there is no particular need for the user to keep the CD-ROMs 21-2, 21-3, 21-6 and 21-7 that have stored thereon detailed limited-area map data describing detailed map areas through which the route does not pass.

By predetermining the kinds (numbers) of CD-ROMs possessed by the user, it is possible to display disk-switching information using their kinds or numbers only when the vehicle travels into the areas described by the data stored on the CD-ROMs kept by the user; that is, no disk-switching information is provided when the vehicle travels into areas corresponding to CD-ROMs not possessed by the user. This avoids the necessity for providing unnecessary disk-switching message.

The storage media for recording map data are not limited specifically to the CD-ROMs but may also be DVD-ROMs and other storage media, in which case the recording medium drive corresponding to them are used.

As described above, according to Embodiment 1, when it is decided that the current vehicle position is outside the detailed limited area described by the detailed map data recorded on the CD-ROM 21-1 currently loaded in the disk storage drive 1, information is provided which indicates the disk switching to the CD-ROM 21-j having stored thereon map data describing the area covering the current vehicle position. This makes the user aware of the necessity for disk switching to the CD-ROM 21-j to obtain detailed navigation information about the area for which he is heading. Hence, the navigation system of this embodiment continuously provides reliable navigation information on the route to the user's intended destination.

Furthermore, the navigation system of this embodiment is capable of providing navigation information about (or searching for) the route to the intended destination by the combined use of detailed map data describing a detailed limited-area map area and rough wide-area map data describing the whole area including such detailed limited map areas both of which are stored on each of plural storage media. When the current vehicle position is decided to be outside the detailed limited-are map area described by the detailed map data stored in one storage medium, a message is provided which urges the user to switch the current storage medium to another, and when the vehicle travels from one area to another without user's corresponding switching between storage media, the wide-area, rough map data is used to guide the vehicle along the route on the wide-area map being displayed. Accordingly, even when the user uses the wide-area rough map, he is given information about the travel of the vehicle toward a detailed map area outside that in the wide-area rough map, urging him to switch to the storage medium having stored thereon detailed limited-area map data describing the new detailed map area.

Embodiment 2

According to a second embodiment (Embodiment 2) of the present invention, when it is decided that the current vehicle position is in a predetermined one of areas described by map data recorded on a CD-ROM 21-i loaded in the disk storage drive 1, a message is provided which urges the user to switch the CD-ROM 21-i to a CD-ROM 21-j having stored thereon map data describing the neighboring area toward which the vehicle is traveling.

The control part 10 makes a check to determine, for instance, whether the distance along the route from the current vehicle position to the boundary of the detailed limited area described by the map data read out of the CD-ROM 21-i is shorter than a predetermined value, and if so, the control part 10 controls the image processing part 6 and the speech processing part 8 to produce a visual and a voice message indicating the necessity for disk switching to the CD-ROM 21-j on which there is stored map data describing the area to which the route extends.

This embodiment is identical in construction with Embodiment 1 except the above, and for brevity sake, no detailed description will be repeated.

As described above, according to Embodiment 2, when it is decided that the current vehicle position is in a predetermined one of areas described by map data recorded on a CD-ROM 21-i loaded in the disk storage drive 1, a message is produced which urges the user to switch the CD-ROM 21-i to a CD-ROM 21-j having stored thereon map data describing the neighboring area toward which the vehicle is traveling. This makes the user aware of the necessity for disk switching to the CD-ROM 21-j in advance, making it possible to provide reliable navigation information continuously over a plurality of areas.

INDUSTRIAL APPLICABILITY

As will be appreciated from the above, the navigation system according to the present invention is of great utility in providing detailed navigation information over a wide area.

What is claimed is:

1. A navigation system which reads out map data from a plurality of disk storage media each having stored thereon map data describing one area and provides navigation information for each area, said navigation system comprising:
   current vehicle position detecting means for detecting the current vehicle position;
   disk storage drive adapted to unloadably load therein a selected one of said plurality of storage media, for reading out map data from said loaded selected storage medium;
   route searching means for searching a route from the current vehicle position to a destination based on the map data;
   decision means for deciding whether said current vehicle position detected by said current vehicle position detecting means is inside or outside an area described by predetermined map data stored on said storage medium loaded in said disk storage drive; and
   disk-switching message producing means which, when it is decided by said decision means that said current vehicle position is outside said area, produces a message for disk switching to that one of said plurality of storage media which has stored therein map data describing an area covering said detected current vehicle position,
   wherein each time the disk switching is effected, said route searching means reads out map data from the storage medium newly loaded in the disk storage drive and searches for an optimum route within an area described by the map data read out from the newly loaded storage medium.

2. The navigation system according to claim 1, further comprising an operating part for inputting a user's destination, and wherein:
   said decision means decides whether said user's destination is inside or outside said area described by said predetermined map data stored on said storage medium loaded in said disk storage drive; and
   said disk-switching message producing means produces a message for disk switching to that one of said plurality of storage media which has stored therein map data describing an area covering said user's destination when it is decided by said decision means that said user's destination is outside said area.

3. The navigation system according to claim 1, wherein:
   said decision means decides whether said current vehicle position detected by said current vehicle position detecting means is inside a predetermined one of areas described by map data stored on said storage means loaded in said disk storage drive; and
   said disk-switching message producing means produces a message for disk switching to that one of said plurality of storage media which has stored therein map data describing a neighboring area in the direction of travel said vehicle when it is decided by said decision means that said user's destination is outside said area.

* * * * *